United States Patent [19]

Findl

[11] Patent Number: 4,529,670

[45] Date of Patent: Jul. 16, 1985

[54] FUEL CELL HAVING DUAL ELECTRODE ANODE OR CATHODE

[75] Inventor: Eugene Findl, Coram, N.Y.

[73] Assignee: The United States of America as represented by the United States Department of Energy, Washington, D.C.

[21] Appl. No.: 598,611

[22] Filed: Apr. 10, 1984

[51] Int. Cl.³ .............................................. H01M 8/08
[52] U.S. Cl. ....................................... 429/38; 429/15; 429/34
[58] Field of Search ..................... 429/15, 27, 101, 34, 429/38

[56] References Cited

U.S. PATENT DOCUMENTS 3,506,493  4/1970  Eisenberg ............................... 136/86
4,037,023  7/1977  Grehier et al. ......................... 429/12
4,390,602  6/1983  Struthers .............................. 429/101

Primary Examiner—Donald L. Walton
Attorney, Agent, or Firm—Vale P. Myles; Hugh W. Glenn; Judson R. Hightower

[57] ABSTRACT

A fuel cell that is characterized by including a dual electrode anode that is operable to simultaneously electro-oxidize a gaseous fuel and a liquid fuel. In alternative embodiments, a fuel cell having a single electrode anode is provided with a dual electrode cathode that is operable to simultaneously reduce a gaseous oxidant and a liquid oxidant to electro-oxidize a fuel supplied to the cell.

14 Claims, 3 Drawing Figures

FUEL CELL HAVING DUAL ELECTRODE ANODE OR CATHODE

The U.S. Government has rights in this invention pursuant to Contract Number DE-AC02-76CH00016, between the U.S. Department of Energy and Associated Universities Inc.

BACKGROUND OF THE INVENTION

This invention relates to fuel cells and, more particularly, relates to fuel cells that are provided with either a dual electrode anode or a dual electrode cathode. Such a dual electrode cell is operable to either produce electrical energy simultaneously from a gaseous fuel and a liquid fuel, in the case of a dual electrode anode, or to simultaneously reduce a gaseous oxidant and a liquid oxidant, in the case of a dual electrode cathode.

The use of fuel cells for the production of electric energy is generally well known. During the first hundred years after the operating principles of simple fuel cells were known, such cells were largely experimental curiosities, because only relatively low-power cells were developed. By the 1950's, however, fuel cells capable of generating several kilowatts of electrical energy were successfully built and operated. Since that time, significant advances have been made in developing fuel cells so that now many different types of cells are in common use. For example, fuel cells have successfully utilized both acidic and alkaline electrolytes, and cells have been developed that utilize either gaseous fuels such as hydrogen, or liquid fuels such as alcohol. Either oxygen or air is normally used as the oxidant in modern fuel cells, but liquid oxidants such as hydrogen peroxide have also been successfully employed.

Although extensive experimentation and development of fuel cells has taken place heretofore, the basic structural components of such cells has remained largely unchanged, at least insofar as all known prior art fuel cells utilize a single electrode anode and a single electrode cathode that are operably mounted in mutual contact with a suitable electrolyte. Current is conducted between the anode and cathode electrodes responsive to electro-oxidization of a fuel within the cell. Furthermore, such generally known fuel cell structures are designed to operate with either a gaseous or a liquid fuel being applied to their respective anode electrodes, rather than being designed to operate with both a gaseous and a liquid fuel being simultaneously applied to their anodes. Similarly, all known prior art fuel cells appear to be designed to operate with either a gaseous or a liquid oxidant being applied to their respective cathode electrodes, rather than being capable of simultaneously reducing both a gaseous and liquid oxidants at their cathodes.

Because of the inherent advantages of fuel cells, relative to alternative technologies for producing electrical energy, efforts are now being made to develop fuel cells that can operate on more complex fuels than those commonly used in earlier cells. In particular, it would be desirable to consume fossil fuels, such as coal in fuel cells. If the chemical energy of coal could be used to produce electrical energy in efficient fuel cells, rather than continuing to be used in conventional combustion processes, with their resultant production of wastes and pollutants and the requirement that associated inefficient transducers be used, it is recognized that many desirable benefits would be realized. For example, fuel cells are noiseless and operate at relatively high efficiencies without creating objectionable by-products of combustion. Moreover, the simple static elements of fuel cells are generally much less expensive to manufacture and maintain in operation than are conventional combustors and associated transducers such as those typically used in steam turbine power generating power systems.

In early development work on fuel cells that can consume coal-derived synthesis gas as a fuel, both alkaline and acidic electrolytes have been considered. In addition, the possible use of both molten carbonate and solid electrolytes has been considered. With such relatively complex synthesis gas fuels, it was anticipated that carbonate formation would foreclose the use of alkaline electrolytes, even though they are generally regarded as superior to other types of electrolytes because such alkaline cells generally have lower operating temperatures and higher performance characteristics and are likely to be less expensive to construct and operate. However, recent experiments with a number of alkaline electrolytes, such as hydroxides, sodium silicate and alkaline carbonates in fuel cells powered by coal-derived synthesis gases has established that certain alkaline electrolytes can be successfully used in such cells without incurring unacceptable levels of carbonate formation. As an evaluation criteria for those experiments, it was decided that a pH level of greater than 10.0 and a resistivity of less than 10 Ohm cm, at about 25° C., should be maintained in the electrolyte along with substantial invariance with $CO_2$. As a result of such experiments, it was determined that CO, which is a major constituent of such coal derived synthesis gas fuels, is converted to formate before it is oxidized to carbon dioxide. Further, it had been hypothesized that the performance of such fuel cells would most probably be limited by concentrations of formate at their anodes, because it is known that formate can be readily electro-oxidized. Accordingly, it was suggested that if formate could be elevated, the performance of such fuel cells could be improved dramatically. Those experimental results and hypotheses are more fully discussed in a paper authored by the present applicant entitled, "Utilization of Carbonaceous Fuels in Alkaline Fuel Cells", which was presented at the II Simposio Interuniversitario De Energia, at Santiago, Chile, during a meeting in November 1983.

It would be advantageous in controlling the operation of fuel cells designed for use with complex fuels, such as those derived from coal synthesis, to develop a fuel cell structure that can be operated to control the concentration of formate present at the anode of the cell. Furthermore, it is foreseen that for some desired future fuel cell applications it will also be desirable to have means for controlling the application of two different oxidants at the cathode of a fuel cell.

OBJECTS OF THE INVENTION

Accordingly, it is a primary object of the present invention to provide a fuel cell that is operable to produce electrical energy simultaneously from a gaseous fuel and a liquid fuel.

Another object of the invention is to provide a fuel cell that operates with a gaseous oxidant and a liquid oxidant simultaneously applied to physically separate, but electrically paralleled, electrodes of a cathode in the cell.

A further object of the invention is to provide a fuel cell having a dual electrode anode and a single electrode cathode.

Yet another object of the invention is to provide a fuel cell having a single electrode anode and a dual electrode cathode.

Further objects and advantages of the invention will be apparent to those skilled in the art from the description of it presented herein, considered in conjunction with the accompanying drawings.

SUMMARY OF THE INVENTION

In one preferred embodiment of the invention a fuel cell is provided with a single electrode cathode and a dual electrode anode, in combination with a fluid electrolyte that contacts all of the electrodes in the cell. The two electrodes of the anode are separated from one another by spacer means, such as a wire mesh, that forms a passageway between facing surfaces of the anode electrodes. In operation, a first fuel, which is a liquid, is passed through the passageway and into engagement with the facing surfaces of the anode electrodes. A second fuel, which is gaseous, is supplied through appropriate conduit means to another surface of one of the anode electrodes, which other surface is separated from the facing surfaces of the anode electrodes by a liquid-confining barrier. A suitable oxidant is applied to the cathode electrode at a surface thereof separated from its surface that is contacted by the cell electrolyte. Electric terminal means are connected, respectively, to the cathode and the anode electrodes for removing electrical energy from the cell as both fuels are consumed simultaneously during their electro-oxidation in the cell.

In an alternative embodiment, a dual electrode cathode and single electrode anode are used in a cell that operates to simultaneously reduce a first gaseous oxidant anode and a second liquid oxidant, as fuel is electro-oxidized within the cell.

DESCRIPTION OF THE PREFERRED EMBODIMENTS

Figure 1:
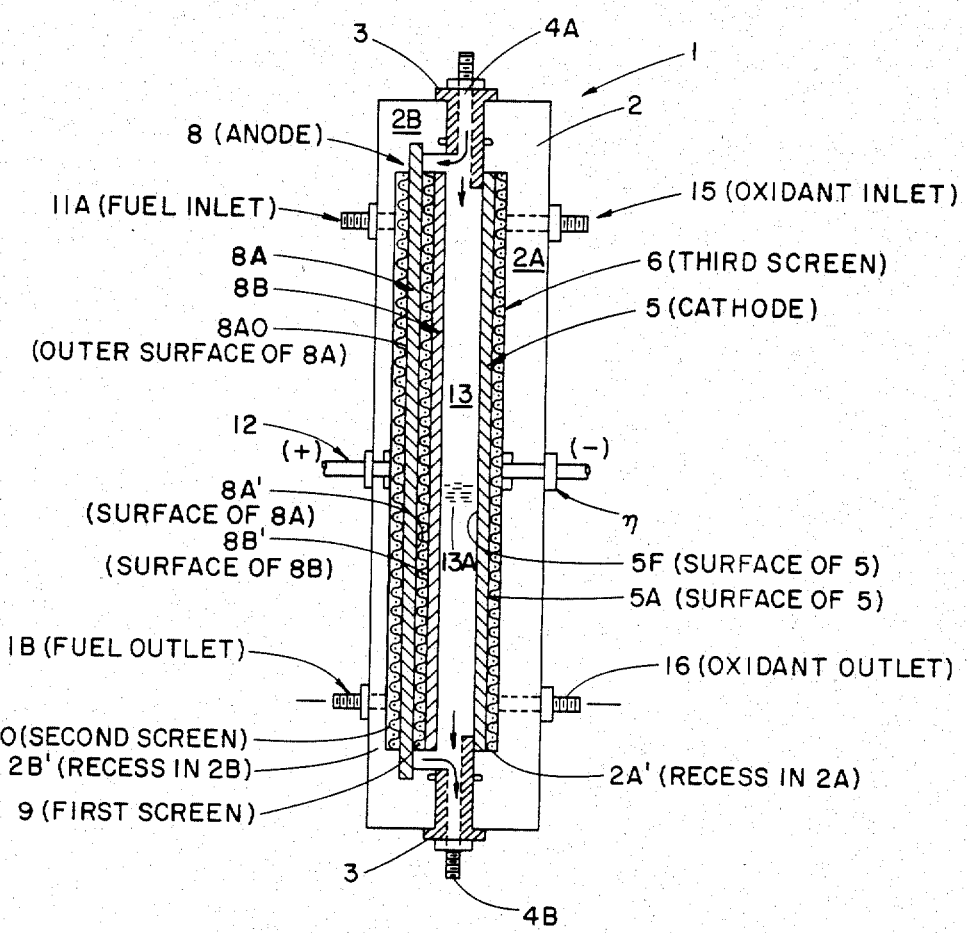
FIG. 1 is a side elevation view, in cross-section along a diametric plane, and not to scale, diagramatically illustrating characteristic components of a fuel cell constructed according to a preferred embodiment of the present invention.

There is shown in FIG. 1 a fuel cell 1, constructed according to the present invention, for producing electrical energy simultaneously from a gaseous fuel and a liquid fuel. The housing or body 2 of the cell can be formed of any suitable conventional material, but in this embodiment of the invention it is formed of steel plates 2A and 2B which are generally disk-shaped in configuration, and are mounted in spaced relationship against a suitable dielectric spacer 3 that is secured between them in any suitable conventional manner. The spacer 3 is formed of polysulfone in the preferred embodiment of the invention. A first fuel conduit means 4A and 4B is provided for passing a first fuel plus electrolyte through the cell 1. In this form of the invention, the first fuel conduit means 4A and 4B include conventional tubing or other suitable types of metal pipes, such as those depicted in FIG. 1, respectively mounted in sealing relationship with the polysulfone spacer 3, at the upper and lower ends of the cell 1. A single electrode cathode 5 is mounted in a recess 2A' suitably formed in the plate 2A of the cell. The cathode electrode 5 is coated with a suitable catalyst (not shown) for promoting a desired electro-chemical reaction at its points of contact with the electrolyte in the fuel cell, as is well known in the art. In this form of the invention the cathode electrode 5 is made of a powdered nickel plaque that has a catalyst-impregnated carbon active surface containing platinum black. Loading of the catalyst is approximately one milligram per square centimeter on the surface of the cathode electrode 5.

The cell 1 also includes a dual electrode anode 8 that comprises a first anode electrode 8A and a second anode electrode 8B, which are each positioned with at least a first of their respective surfaces 8A' and 8B' in facing relationship to one another. A suitable spacer means 9, which in this form of the invention is an electrically conductive metal mesh screen, is positioned between the first and second anode electrodes 8A and 8B to form a passageway between their facing surfaces 8A' and 8B' for diffusing or distributing fuel over those surfaces. Although a variety of suitable conventional materials may be used for forming the anode electrodes 8A and 8B, in the preferred embodiment described here those electrodes are both formed of teflon coated powdered nickel plaques that have catalyst-impregnated, carbon active surfaces. A palladium-platinum black composition is used as the anode catalyst and is loaded at about 1 to 5 milligram per square centimeter on the surfaces of the anode electrodes. The catalyst composition is about 5:1, palladium to platinum, by weight. A second metal mesh screen 10 is positioned against and is generally coextensive with, the outer or second surface 8AO of the first anode electrode 8A for effectively distributing or diffusing fuel over that second surface.

As can be seen in FIG. 1, the dual electrode anode 8 and the first and second mesh screens 9 and 10 are all mounted within a suitable recess 2B' formed in the plate 2B. The first fuel conduit means 4A and 4B open into unrestricted portions of the recess 2B' at the upper and lower ends of the second anode electrode 8B, and of the first anode screen 9, as shown generally by the flow-indicating arrows in FIG. 1. This arrangement enables a first fuel plus electrolyte to pass through the first conduit means 4A and 4B and through the passageway defined by the first screen 9, between and in engagement with the facing surfaces 8A' and 8B' of the anode electrodes.

A second conduit means 11A and 11B, in the form of suitable conventional tubes or pipes are mounted in sealing relationship with the second cell plate 2B, for applying a second fuel to the outer, or second, surface 8AO of the first anode electrode 8A. That second surface 8AO is separated from the aforementioned facing surface 8A' thereof by a suitable liquid-confining barrier (such as a gas porous wet proofing coating [shown as 8AC in FIG. 2] on the outer surface 8AO of the first anode electrode, and by the sealing relationship between the outer peripheral edge extensions of the first anode electride 8A into the body member 2B, beyond the walls of recess 2B'), as shown in FIG. 1. Accordingly, the first fuel supplied through first conduit means 4A and 4B, and the passageway between the first and second anode electrodes 8A and 8B, is prevented from mixing with a second fuel passed through the second conduit means 11A and 11B along the second anode screen 10.

Finally, a suitable conventional electrical conductor and terminal 12 is mounted in electrically conductive relationship with the second screen 10 to provide electrical feed-through for the cell 1. Suitable electrolyte flow channeling means 13, which in this form of the invention includes a compartment between the cathode 5 and the second anode electrode 8B, are operable, in conjunction with the first conduit means 4A and 4B, for applying an electrolyte, generally designated 13A in FIG. 1, between and in contact with predetermined surfaces of the anode and cathode electrodes. In the preferred embodiment of the invention illustrated, the electrolyte 13A is a suitable conventional liquid that is introduced to the cell 1 through the first fuel conduit means portion 4A and is withdrawn from the cell through the other portion of the first conduit means 4B. It can be seen that in this arrangement, the means 13 for applying the electrolyte 13A to the electrodes, and the first conduit means 4A-4B, are operable in conjunction to at least partially mix the electrolyte with the first fuel, before that resultant mixture of electrolyte and first fuel is applied between the facing surfaces 8A' and 8B' of the anode electrodes 8A and 8B, and before it is placed into contact with other predetermined surfaces of the cathode and anode electrodes. Such other surfaces include the surfaces of the cathode and anode electrodes that are in juxtaposition, as seen in FIG. 1. Accordingly, in this form of the invention, the predetermined surfaces of the cathode and anode electrodes to which the electrolyte 13A is applied include those two juxtaposed surfaces as well as the facing surfaces 8A' and 8B' of the first and second anode electrodes.

As noted in the Background portion above, the electrolyte 13A can be of any suitable conventional composition, but in the preferred embodiment of the fuel cell 1 described here, which is suitable for use with complex fuels such as those derived from coal, the electrolyte 13A is a solution of 1.5 Molar $K_2CO_3$ and 0.5 M $KHCO_3$ having a resistivity of about 12 Ohm-cm, at about 25° C. Depending upon the particular first and second fuels that are to be used with other applications or embodiments of the fuel cell 1, it will be appreciated that other suitable electrolytes can be used. For example, it has been found that a mixture of the following three salts in a composition of 20.85%$_w$ $K_2CO_3$, 7.08%$_w$ $KHCO_3$ and 2.43%$_w$ $Cs_2CO_3$ is suitable when a second gaseous fuel having a high CO concentration is utilized in the fuel cell 1, while a first fuel high in formate is also employed. Of course, it will be understood that the electrolyte 13A is effective to conduct electric current between the aforementioned predetermined surfaces of the respective anode and cathode electrodes which it contacts, responsive to the first and second fuels being electro-oxidized in the cell 1 during its operation.

In the preferred form of the invention shown in FIG. 1, the spacer means comprising the first mesh anode screen 9, is effective to form an electrically conductive circuit between the first and second anode electrodes 8A and 8B. To accomplish that objective, the first screen 9 is welded (or otherwise electrically connected) at random spots to the first and second anode electrodes 8A and 8B. Such welds are not illustrated in FIG. 1. As seen in FIG. 1, the electrically conductive first metal screen 9 contacts and is substantially coextensive with the facing surfaces 8A' and 8B' of the anode electrodes; thus, such electric circuit forming welds may be made at any desired points of engagement between the screen and those electrodes.

In order to distribute or diffuse oxidant over the outer or second surface 5A of cathode 5, a suitable third metal screen 6 is positioned against and in generally coextensive relationship with the surface 5A, which is separated and sealed from the surface 5F thereof that is contacted by electrolyte 13A. A suitable conventional electrical conductor and terminal 7 is mounted in sealing relationship with the plate 2A, and in electrically conducting relationship with third screen 6 and cathode 5. Again, though not depicted in FIG. 1, the screen 6 is welded to cathode 5 at random points thereon, to form such an electrically conductive relationship, but other suitable circuit forming means can be used between cathode 5 and screen 6.

Oxidant is applied to cathode 5 by passing it through suitable conventional oxidant applying means 15–16 for applying either a gaseous or liquid oxidant to the second or outer surface 5A of the cathode electrode 5, thereby to enable cell 1 to effect electro-oxidation of the first and second fuels supplied to cell 1. The oxidant applying means 15 and 16 are suitable pipes mounted in sealing relationship through plate 2A, and are operable, in conjunction with screen 6, to distribute oxidant over surface 5A of the cathode.

Figure 2:
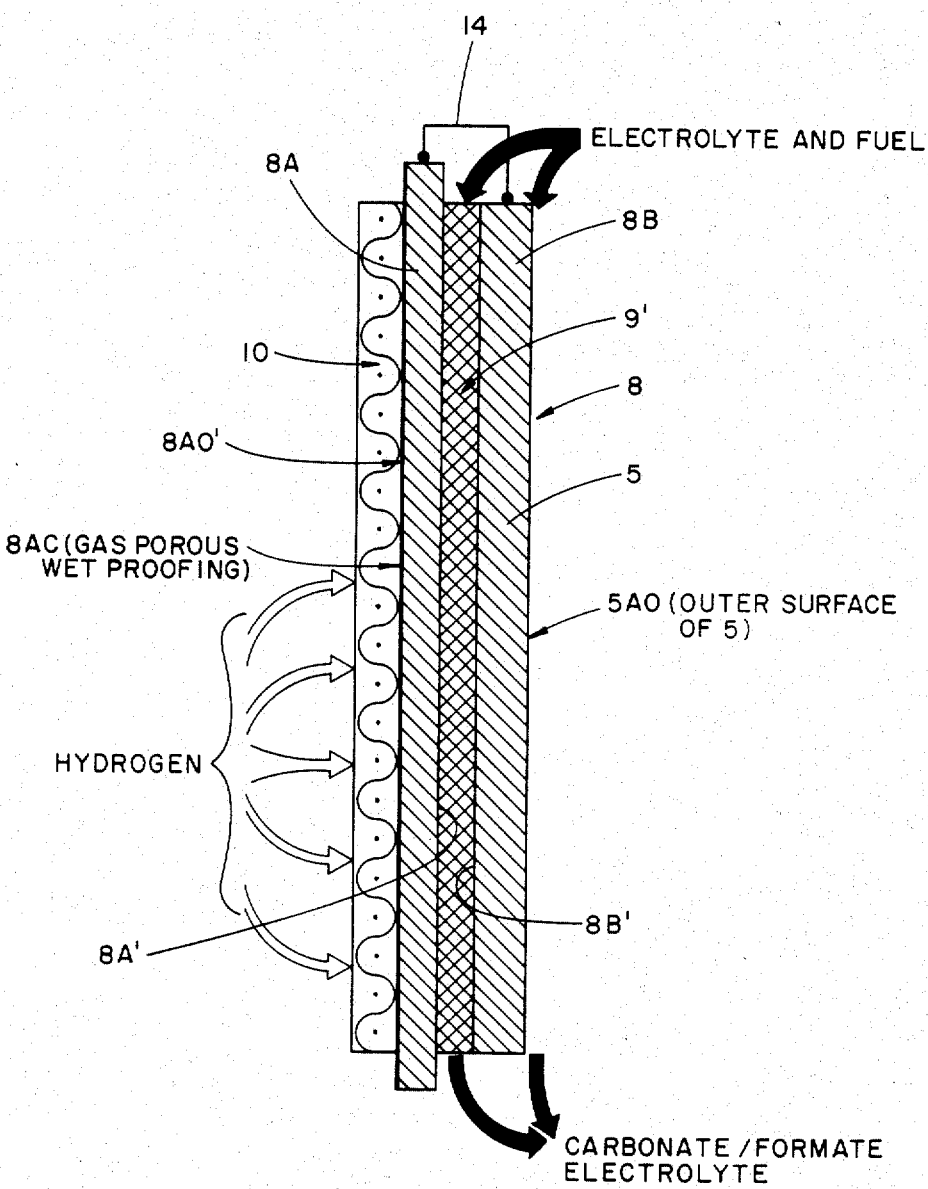
FIG. 2 is a schematic diagram showing a side view of a dual-electrode anode structure, and associated fuel-distributing or diffusing mesh screens, in combination with electric circuit means for interconnecting the electrodes, to illustrate certain characteristic features of the type of dual-electrode anode depicted in FIG. 1 of the drawings and to show an alternative arrangement for connecting the anode electrodes in electrical parallel.

Referring now to FIG. 2 of the drawing, an alternative embodiment of the invention is shown diagramatically, in order to illustrate other means for effecting the desired electrical paralleling of the anode electrodes 8A and 8B. As shown in FIG. 2, a suitable electric circuit means 14 in the form of a conventional electrical conductor that is affixed by conventional terminal means on its opposite ends to respective edges of first anode electrode 8A and second anode electrode 8B affords such paralleling of the electrodes 8A and 8B. A further modification of the invention, as it was described with reference to FIG. 1, is depicted in FIG. 2 as an alternative type of spacer means or first anode mesh screen 9' in the form of a dielectric material such as woven nylon. The screen 9' is effective to diffuse the first fuel and electrolyte 13A that passes through the passageway formed by the screen 9', and thus passes the fuel evenly over the facing surfaces 8A' and 8B' of the anode electrodes, but it does not act as an electric circuit between the anode electrodes.

As further shown in FIG. 2, the left side or outer surface 8AO' of first anode electrode 8A is coated with a gas porous wet proofing coating 8AC, which is effective to enable a gaseous fuel such as hydrogen or carbon monoxide, to penetrate the coating 8AC and porous electrode 8A, so it can become electro-oxidized in the cell 1. At the same time, the coating 8AC is effective to prevent electrolyte 13A, and the first liquid fuel passed through first conduit means 4A–4B, from passing through coating 8AC to mix with the second gaseous fuel on the outer (left side in FIG. 2) side of the coating, during normal operation of the fuel cell 1.

Finally, as indicated at the bottom of FIG. 2 (assuming a case wherein the fuel cell 1 is used to simultaneously electro-oxidize a first liquid fuel such as formate, and a second gaseous fuel such as $H_2$), there will be discharged through the second portion of the first conduit means 4B (shown in FIG. 1) an effluent that contains carbonate, which is a byproduct of the electro-oxidizing reaction of the first fuel in normal operation of the cell. Of course, air or pure oxygen, or a suitable liquid oxidant, would be applied to the second or outer surface 5A of the cathode electrode 5 (shown in FIG. 1), in such a case, to effect the desired electro-oxidation of the first and second fuels in the cell 1.

The operation of fuel cell 1, and the modified embodiments thereof discussed above with reference to FIG. 2, will be apparent to those skilled in the art. It will be understood that in such operation, a first liquid fuel is mixed with an electrolyte and the mixture is passed into engagement with the above-noted predetermined surfaces of the cathode and anode electrodes, including the facing surfaces 8A' and 8B' of the anode electrodes, and then is exhausted from the cell 1 through the portion of first conduit means 4B at the lower end of the cell, as seen in FIG. 1. Air or any other suitable oxidant is distributed or diffused over the outer surface 5A of cathode electrode 5 by the third screen 6. A positive voltage is applied to the anode conductor and terminal 12, while a negative voltage is applied to the cathode conductor and terminal 7, thereby to initiate electro-oxidation within the cell and to produce an electric current through the electrolyte 13A. Thus it can be seen that the fuel cell 1 affords the primary desired objective of the invention whereby it is operable to simultaneously electro-oxidize a gaseous fuel and a liquid fuel to produce an output of electrical energy at the terminals 7 and 12.

Figure 3:
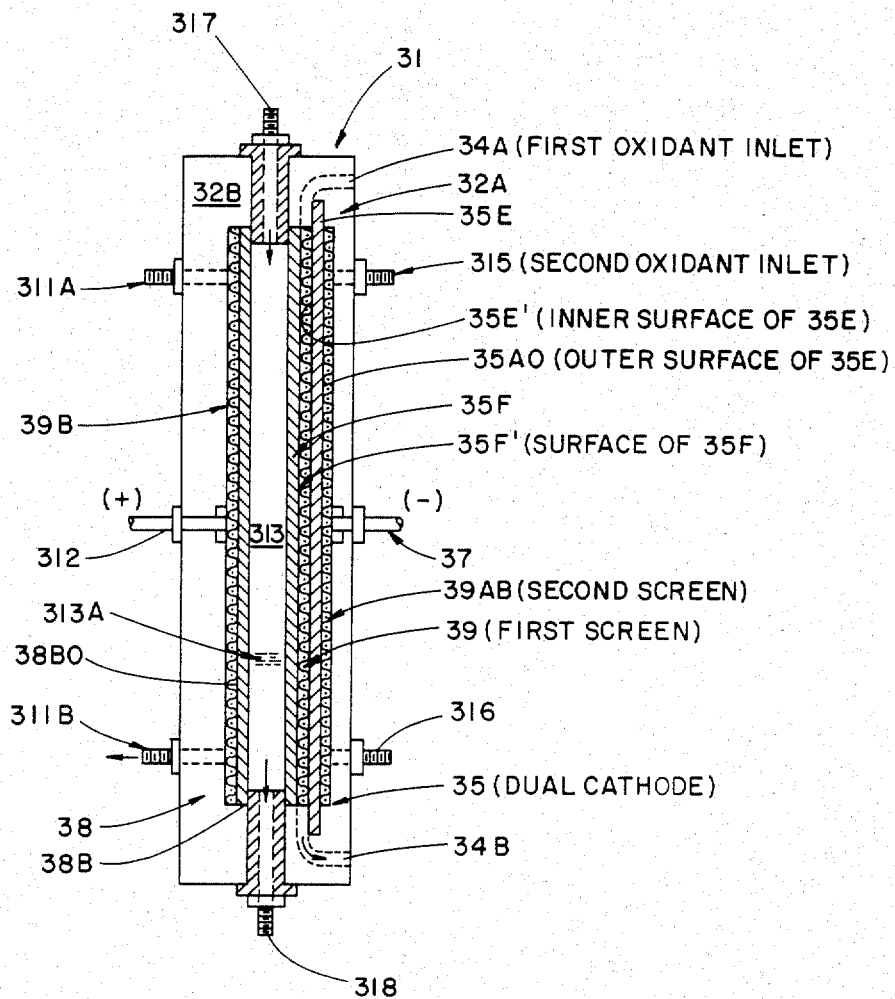
FIG. 3 is a side plan view, in cross-section along a diametric plane, and not to scale, of another embodiment of the present invention showing a fuel cell having a dual electrode cathode that is operable to reduce both gaseous and liquid oxidants that can be simultaneously applied to the respective electrodes of the cathode.

Now that the first preferred embodiments of the invention have been described, reference is made to FIG. 3 of the drawing to describe another embodiment of the invention wherein a fuel cell is provided for producing electrical energy by electro-oxidizing a fuel with a gaseous oxidant and a liquid oxidant, simultaneously. To simplify the description of this embodiment of the invention, the same reference numbers and alpha-numerics that were used to identify components in FIGS. 1 and 2 will be used for like components in FIG. 3, except that a prefix "3" is added to the numbers. It will be understood that similar materials to those described above with reference to the embodiment shown in FIG. 1, can be used in operating the embodiment of the invention shown in FIG. 3. Thus, there is illustrated in FIG. 3 a fuel cell 31 having a single electrode anode 38 and a dual electrode cathode 35. The cathode 35 includes a first cathode electrode 35E and a second cathode electrode 35F that are each positioned with at least a first of their respective surfaces 35E' and 35F' in facing relationship to one another. Spacer means 39 in the form of a first metal mesh screen (39) is disposed between the cathode electrodes 35E and 35F and is effective to form a passageway through the mesh screen between their facing surfaces 35E', 35F'.

A first conduit means 34A–34B, are provided through the plate 32A of cell 31 for passing a first fluid oxidant through the passageway defined by spacer means 39, and into engagement with the facing surfaces 35E'–35F' of the cathode electrodes. A second conduit means 315–316, which may be any suitable tube or pipe configuration, such as those discussed above with reference to numbers 15 and 16 in FIG. 1, is mounted as shown in FIG. 3 for applying a second fluid oxidant to a second or outer surface 35AO of the first cathode electrode 35E. That second surface 35AO is separated from the afore-mentioned facing surface 35E' of the first cathode electrode 35E by a suitable oxidant-confining barrier that is formed by the outer peripheral edge of the first cathode electrode 35E and its engagement with the plate 32A of cell 31.

As was the case with the embodiment of the invention discussed above with reference to FIG. 2, the embodiment shown in FIG. 3 includes means 313 defining a compartment (313) between the anode and the cathode, which means are operable in conjunction with further suitable conduit means 317 and 318 for applying an electrolyte 313A between and in contact with predetermined juxtaposed surfaces of the cathode and anode electrodes. Thus, the electrolyte 313A flows, as shown by the arrows in FIG. 3, into the aperture defined by said further conduit means 317, and out of the aperture defined by the further conduit means 318. In the cell, the electrolyte is effective to conduct electric current between those predetermined surfaces of the respective cathode and anode electrodes, responsive to the first and second oxidant being reduced to thereby electro-oxidize a fuel within the cell 31. Thus electric energy can be withdrawn from the cell 31 through cathode terminal and conductor 37 and anode terminal and conductor 312, when the cell is placed in operation.

The cell 31 shown in FIG. 3 also includes a fourth conduit means 311A and 311B, in the form of suitable conventional hollowed tubes or pipes mounted in sealing relationship with the second body plate 32B for applying a suitable gaseous or fluid fuel to a second or outer surface 38BO of the anode electrode 38B, in order to effect electro-oxidation of said fuel by both the first and second oxidants, simultaneously, within the cell 31. A suitable mesh anode screen 39B, which is mounted in engagement with the outer surface 38BO of the anode electrode, and is generally coextensive with that surface, is provided to distribute the fuel flowing through fourth conduit means 311A–311B uniformly over the anode electrode 38B.

Also, in order to distribute oxidant over the outer surface 35AO of first cathode electrode 35E, a second cathode mesh screen 39AB is mounted in engagement with, and in substantially coextensive relationship with, that cathode electrode. Thus, when a first gaseous oxidant is introduced to the cell 31 through first oxidant conduit means portion 34A and is exhausted therefrom through the first oxidant conduit means portion 34B shown in FIG. 3, that gaseous oxidant is distributed by the first spacer screen 39 in generally uniform fashion over the facing electrode surfaces 35E'–35F'. Similarly, when a second oxidant, which may be a liquid such as hydrogen peroxide, is introduced through second fluid conduit means portion 315 and is exhausted through second fluid conduit means portion 316, it is distributed uniformly over the outer surface 35AO of the first cathode electrode 35E by the second cathode screen 39AB.

The operation of the embodiment of the invention shown in FIG. 3 will be apparent to those skilled in the art from the foregoing description of its characteristic structural features and the related explanation of the operation of the respective components of the embodiment depicted in FIGS. 1 and 2, as presented above. It will also be apparent that various alternative forms and modifications of this (FIG. 3) embodiment of the invention may be made, particularly as described above with reference to the modifications discussed relative to the embodiments of the invention shown in FIG. 2. Thus, it is my intention to encompass within the scope of the following claims all such modifications, and to define therein the true limits of my invention.

I claim:

1. A fuel cell for producing electrical energy simultaneously from a gaseous fuel and a liquid fuel, said cell comprising;
   a single cathode electrode,
   a dual electrode anode comprising; first and second anode electrodes each positioned with at least a first of their respective surfaces in facing relationship to one another, and spacer means forming a passageway between said facing surfaces,
   a first fuel conduit means for passing a first fuel through said passageway and into engagement with said facing surfaces,
   a second conduit means for applying a second fuel to a second surface of the first anode electrode, said second surface being separated from said facing surface thereof by a liquid-confining barrier,
   means for applying an electrolyte between and in contact with predetermined surfaces of said anode and cathode electrodes, said electrolyte being effective to conduct electric current between said predetermined surfaces responsive to said first and second fuels being electro-oxidized in the cell, and
   means for applying an oxidant to a second surface of said cathode electrode to effect the electro-oxidation of said first and second fuels in the cell.

2. An invention as defined in claim 1 wherein said spacer means is effective to form an electrically conductive circuit between the first and second anode electrodes.

3. An invention as defined in claim 2 wherein said spacer means is an electrically conductive metal screen that contacts random points on, and is substantially coextensive with, said facing surfaces.

4. An invention as defined in claim 3 including a second metal screen positioned against and generally coextensive with said second surface of the first anode electrode, said second screen being effective to diffuse said second fuel over said second surface.

5. An invention as defined in claim 4 including a third metal screen positioned against and generally coextensive with said second surface of the cathode electrode for distributing oxidant over said second surface.

6. An invention as defined in claim 1 including electric circuit means for forming an electrically conductive circuit between the first and second anode electrodes, thereby to place said anode electrodes in electrical parallel.

7. An invention as defined in claim 6 wherein said spacer means is formed of dielectric material and is effective to diffuse the first fuel passing through said passageway over said facing surfaces of the anode electrodes.

8. An invention as defined in claim 1 wherein said first fuel conduit means is further effective to pass said first fuel into engagement with said predetermined surfaces of the second anode electrode that are contacted by said electrolyte.

9. An invention as defined in claim 7 wherein said means for applying an electrolyte and said first conduit means are operable to at least partially mix an electrolyte with said first fuel, before that mixture of electrolyte and first fuel is applied between the facing surfaces of said anode electrodes and into contact with said predetermined surfaces of said cathode and anode electrodes.

10. An invention as defined in claim 1 wherein said second fuel is a gaseous fuel.

11. An invention as defined in claim 10 wherein said first conduit means is effective for passing a liquid fuel into engagement with said facing surfaces of the first and second anode electrodes.

12. A fuel cell for producing electrical energy by electro-oxidation of a fuel with a gaseous oxidant and a liquid oxidant simultaneously, said cell comprising;
   a single-electrode anode,
   a dual electrode cathode comprising; first and second cathode electrodes each positioned with at least a first of their respective surfaces in facing relationship to one another, and spacer means forming a passageway between said facing surfaces,
   a first conduit means for passing a first fluid oxidant through said passageway and into engagement with said facing surfaces,
   a second conduit means for applying a second fluid oxidant into engagement with a second surface of said first cathode electrode, said second surface being separated from said facing surface thereof by a liquid-confining barrier,
   further conduit means for applying an electrolyte between and in contact with predetermined surfaces of said cathode and anode electrodes, said electrolyte being effective to conduct electric current between said predetermined surfaces responsive to said first and second oxidants being reduced to electro-oxidize a fuel in the cell, and
   a fourth conduit means for applying a fluid fuel to a second surface of said anode electrode to effect electro-oxidation of said fuel by both said first and second fluid oxidants, simultaneously, within the cell.

13. A fuel cell as defined in claim 12 wherein said first fluid oxidant is gaseous.

14. A fuel cell as defined in claim 13 wherein said second fluid oxidant is a liquid.

* * * * *